Dec. 31, 1935.  J. W. KAYE  2,025,752
STEAM TRAP
Filed May 2, 1932  2 Sheets-Sheet 2
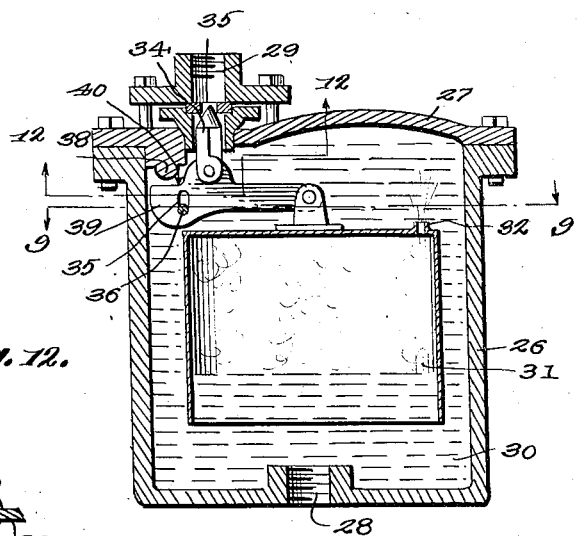
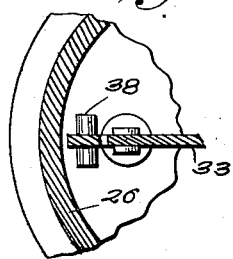
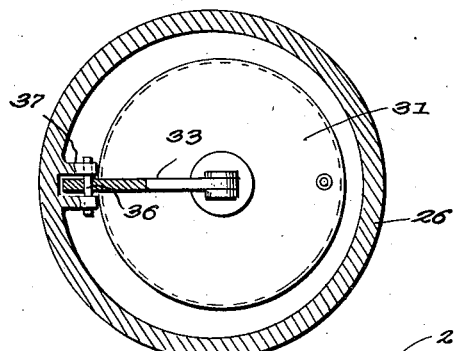
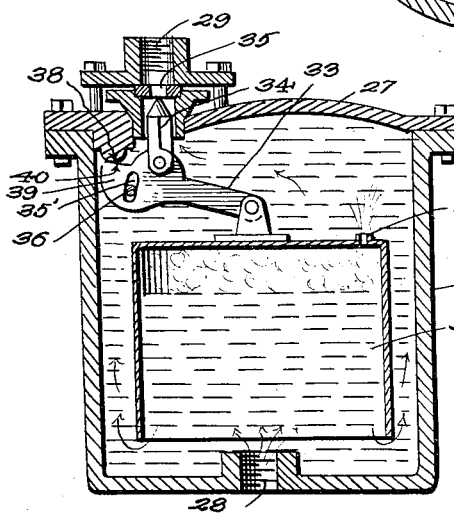
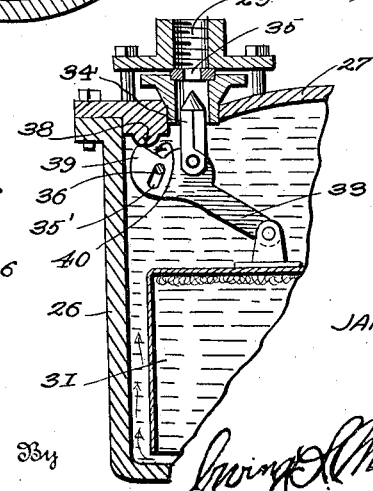
Inventor
JAMES W. KAYE Patented Dec. 31, 1935

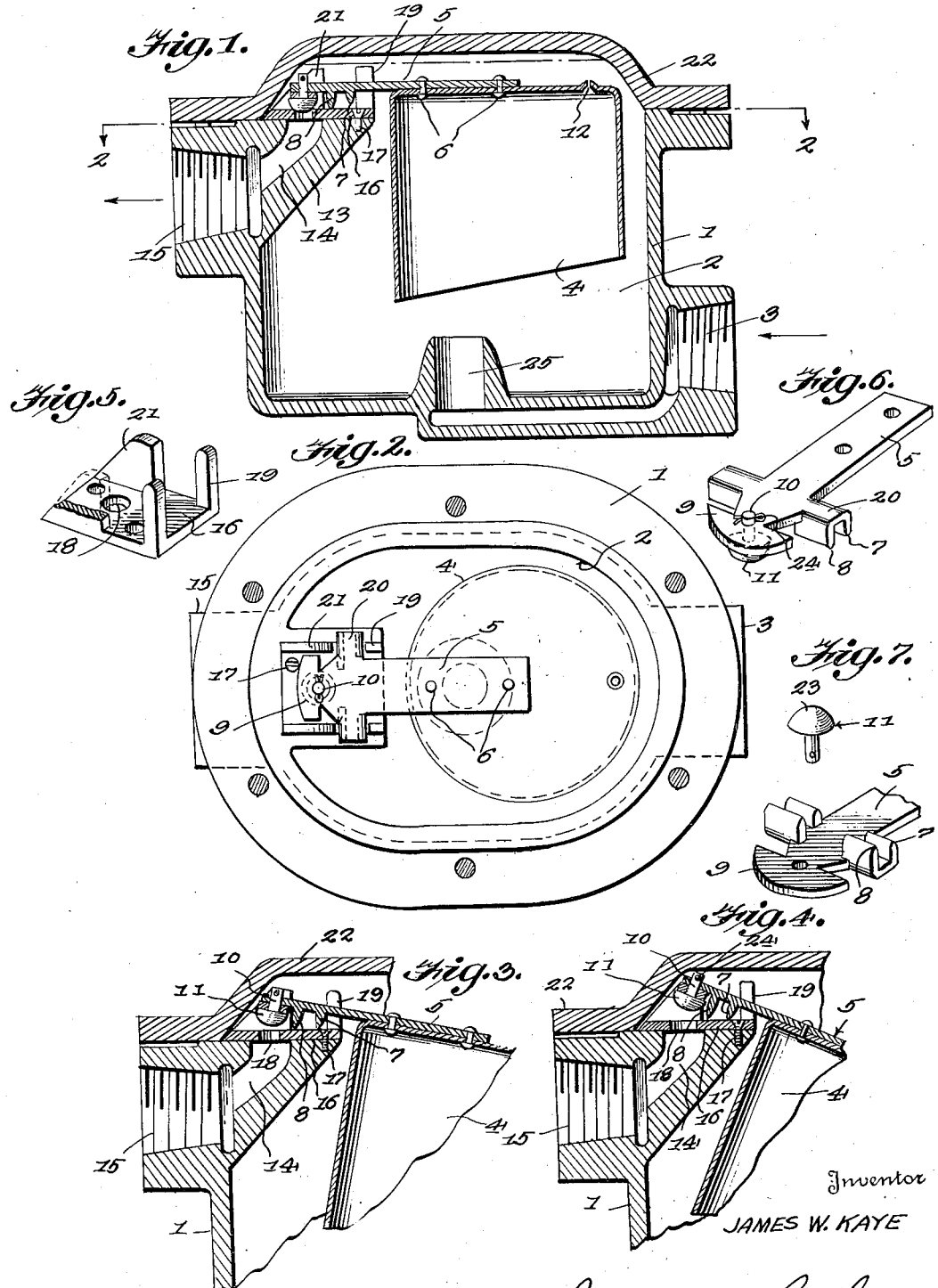

2,025,752

UNITED STATES PATENT OFFICE 2,025,752

STEAM TRAP

James W. Kaye, West Orange, N. J., assignor to Kaye & MacDonald, Inc., West Orange, N. J., a corporation of New Jersey Application May 2, 1932, Serial No. 608,807

11 Claims. (Cl. 137—103)

This invention relates to steam traps and has for its object the production of an inverted bucket-type trap which will provide an extra large capacity in proportion to the very small dimensions of the trap.

Another object of this invention is the production of a steam trap wherein the operating lever is provided with a plurality of pivots.

A further object of this invention is the production of a steam trap in the nature of an embodiment of the invention wherein the valve seat and port are in a horizontal position and are located below the valve, no mechanism being carried by the cover.

Other objects and advantages of the present invention will appear throughout the following specification and claims.

In the drawings:—

Figure 1 is a vertical sectional view of the trap;

Figure 2 is a top plan view of the trap;

Figure 3 is a vertical sectional view of a portion of the trap showing the valve partially open;

Figure 4 is a sectional view similar to Figure 3, showing the valve in a completely open position;

Figure 5 is a detail perspective view partly in section of the operating lever supporting plate and valve lever guide;

Figure 6 is a detail perspective of the valve-operating lever;

Figure 7 is an inverted perspective view of one of the inner ends of the valve operating lever and valve shown in a separated position;

Figure 8 is a vertical section of a modified form of the invention;

Figure 9 is a section taken on line 9—9 of Figure 8;

Figure 10 is a vertical sectional view through the casing shown in Figure 8, the valve being shown in a partly open position;

Figure 11 is a vertical sectional view through a part of the casing showing the valve in its fully open position; and Figure 12 is a horizontal sectional view taken on line 12—12 of Figure 8.

By referring to the drawings, it will be seen that 1 designates the casing of the steam trap which is provided with a main chamber 2 having an inlet connection 3 where the steam line delivers condensation into the interior of the casing 1, or to the chamber 2. An inverted bucket 4 is mounted within the chamber 2 and this inverted bucket 4 is supported by a lever 5, which lever comprises a flat strip and is secured to the top of the inverted bucket 4 by means of a suitable rivet or other securing means 6. This lever 5 is provided with compound rocking knife edges 7 and 8, the knife edge 7 being shorter than the knife edge 8 as clearly illustrated in the drawings, these knife edges 7 and 8 constituting fulcrum portions and being arranged in parallel relation with respect to each other extending across the transverse axis of the lever 5. The bucket supporting lever 5 is provided with a projecting head 9, through which projecting head 9 extends the shank 10 of the valve member 11, the valve member 11 projecting below the head 9 and being adapted to close the valve seat which will be hereinafter described. In carrying out the invention, I preferably provide an air vent 12 in the top of the inverted bucket 4.

The casing 1, as shown clearly in Figures 1, 3, and 4 of the drawings, is provided with a suitable boss 13 projecting within the main chamber 2 and this boss 13 is provided with an outlet passage 14 communicating with an outlet connection 15 of the usual type. The upper end of this boss 13 carries a lever supporting plate 16 which plate comprises a flat body which snugly fits over the top of the boss and is secured thereto by means of suitable securing screws 17. This plate 16 is provided with an aperture 18, the periphery of which constitutes a valve seat, which aperture 18 communicates with the passageway 14 formed in the boss 13. The plate 16 is provided with a pair of vertically extending spaced fingers 19 between which the lever 5 extends, and is held against lateral displacement therefrom. The lever 5 is provided with laterally extending arms 20 from which the compound knife edges 7 and 8 depend and these laterally extending arms 20 fit behind the fingers or arms 19 of the plate 16 as shown clearly in Figure 2 of the drawings, and the plate 16 is also provided with upstanding fingers 21 arranged in spaced relation with respect to the fingers 19, these fingers 19 and 21 constituting means for retaining the laterally extending arms 20 of the lever 5. In mounting the lever 5 in conjunction with the plate 16, the lever will normally extend in a position shown in Figure 1, and the longer or higher knife edge fulcrum 8 will rest against the upper face of the plate 16 and firmly hold the valve 11 in a closed position over the aperture 18 and close the passage 14.

As shown in the drawings, the moving parts are all supported by the casing 1, and a suitable cover 22 may be mounted upon the casing 1 and this cover is entirely independent of the valve and operating parts of the trap, thereby permitting the removal of the cover without the necessity of removing any of the working parts and permitting free access to the interior of the casing for the purpose of repair or replacement. In the structure as shown clearly in Figure 1, the parts may be readily lifted out of position, that is to say, the lever 5 and bucket 4 for the purpose of replacing worn parts or renewing the valve 11 should it be desired. The valve 11 preferably is provided with a rounded lower nose 23, and the shank portion 10 of the valve 11 is removably held in place through the medium of a suitable securing cotter pin 24.

The steam trap operates in the same manner as other traps of this type, the steam, air and water entering the float chamber through the bottom port 25. So long as water enters the float chamber 2, the float 4 will remain in its lowered position such as is shown in Figure 4, consequently raising the valve 11 to its open position and permitting the opening of the passage 14. The water entering the float chamber 2 is therefore free to flow from the chamber through the passage 14. However, when steam or air enters the float chamber 2, the float will rise with the consequent closing of the aperture 18 by the valve 11. As the steam in the bucket condenses other steam or water will enter from the bottom. If steam enters it will enter the inverted bucket and maintain the buoyancy thereof; if water enters the bucket will fill with water and its buoyancy will be destroyed. The bucket will then sink and this will pull downwardly rocking the lever 5 upon the high fulcrum knife-edge 8, initially moving the valve 11 away from the aperture 18. As the bucket continues to move downwardly, the shorter knife edge fulcrum 7 will come in contact with the upper face of the plate 16, and this will cause the valve 11 to be more rapidly swung to a fully open position, and it should be understood that sufficient space is provided between the pair of fingers 21 and the pair of fingers 19 to allow the laterally extending arms 20 to freely operate without frictional contact under ordinary conditions with the arms 21 and 19.

From the foregoing description, it will be seen that a very simple and efficient improved type of steam trap has been provided, having large side outlets and eliminating complicated cored water passages where the flash-back from high temperature condensate in passages retards capacity. Furthermore, it should be understood that a simple and efficient means has been provided for actuating the valve through the improved lever mechanism wherein a comparatively high leverage is employed for initially opening the valve, and a low leverage is provided in closing. The provision of a plurality of fulcrum points will greatly facilitate the opening and closing of the valve as the bucket 4 is raised and lowered.

In Figures 8 to 12 inclusive, there is shown a modified form of the invention wherein a casing 26 is employed having a cover 27, the casing 26 being provided with an inlet port or opening 28, and the cover being provided with an outlet port or opening 29. As shown in the modified form just referred to, the casing 26 is provided with a main chamber 30 within which is mounted an inverted bucket 31 having a vent opening 32. The bucket 31 is pivotally secured to a supporting lever 33, which supporting lever 33 carries a cone-shaped valve 34, which valve 34 is adapted to control the opening and closing of the valve seat 35 located adjacent the outlet port 29. This lever 33 is provided with a vertically extending elongated aperture or slot 35, which fits over a supporting pin 36 carried by the casing 26 or supported in any suitable or desired manner, such for instance as illustrated in Figure 9, the supporting pin being carried by the spaced ears 37. The cover 27 is provided with a boss or enlargement 38 upon the underface thereof, which boss or enlargement 38 is adapted to be engaged by the projecting fulcrum portion 39 of the supporting lever 33. The supporting pin 36 is placed forwardly with respect to the boss 38, in other words the pin 36 and the boss 38 being arranged out of vertical alignment.

As the bucket 31 moves downwardly through an action such as has been described in the previous embodiment, the lever 33 will swing upon the pivot pin 36 and initially draw the valve 34 out of engagement with the seat 35. As this downward movement of the bucket 31 continues, however, the upper face 40 of the fulcrum portion 39 of the lever 33 will engage the lower face of the boss 38 and change the point of fulcrum from the pin 36 to the boss 38 and more rapidly pull the valve 34 away from the seat 35 to a fully open position, the elongated structure of the slot 35' permitting this change of fulcrum points and permitting the upward swing of the lever 33 when the upper face of the fulcrum portion 39 of the lever 33 engages the lower face of the boss 38.

From the foregoing description it will be seen that a very simple and efficient means has been provided whereby the valve 34 may be rapidly moved to an open position as the bucket 31 continues to descend, the initial opening being provided through the pivot point 36 in conjunction with the lever, and the further opening being provided by the contact of the fulcrum portion 39 of the lever with the boss 38.

As the bucket 31 rises, the parts will return to initial position and the valve will close.

It should be understood that the distance between the spaced fingers 19 and 21 is only sufficient to allow just enough clearance for the swinging of the lever and permitting the knife edge just to clear these arms.

It should be understood that certain detail changes may be employed without departing from the spirit of the invention, so long as these changes fall within the scope of the appended claims.

Having described the invention, what is claimed as new is:—

1. A trap of the class described comprising a casing, said casing provided with an outlet port, said casing also having a valve seat adjacent said port, an operating lever for controlling the opening and closing of said valve seat, a valve carried by said lever, said lever provided with a plurality of relatively narrow knife-edge fulcrums arranged in spaced relation, and being formed of different depth for progressively engaging the casing to control the opening and closing of said valve at different points of the swing of said lever.

2. A trap of the character described comprising a float chamber with an inlet and an outlet and a support having a valve seat at the outlet, a lever mounted adjacent said valve seat, a valve carried by said lever, said lever being provided with a plurality of spaced knife-edge fulcrums extending transversely of the lever and being adapted to engage a support for controlling the opening and closing of said valve, and a float connected to said lever.

3. A trap of the character described comprising a float chamber with an inlet and an outlet and a support having a valve seat at the outlet, an operating lever, a valve carried by said operating lever, said operating lever provided with a pair of transversely extending knife-edge fulcrums adapted to engage a support for facilitating the swinging of said lever for the opening and closing of said valve, said lever provided with a projecting edge, and means for detachably supporting said valve in engagement with said projecting edge.

4. A device of the class described comprising a support, a plate mounted upon said support and having a valve seat therein, a plurality of spaced retaining fingers carried by said plate, a lever mounted between said fingers, a valve carried by said lever for controlling the opening and closing of said valve, said lever provided with laterally projecting arms fitting between said fingers whereby said lever will be held against accidental displacement from said plate, said laterally extending fingers being provided with depending knife-edge fulcrums of different depth to provide automatically changeable progressively operating fulcrum points for said lever as said lever is swung.

5. A trap of the character described comprising a float chamber with an inlet and an outlet and adjacent the outlet a support provided with a valve seat, a valve for controlling the opening and closing of said valve seat, a lever supporting said valve, said lever provided with an elongated slot, a fulcrum pin fitting in said slot and constituting a pivot for said lever, said support provided with a fulcrum contact boss spaced beyond said fulcrum pin, said lever provided with an extended fulcrum portion adapted to engage said boss to provide progressively operating changeable contact fulcrum points for said lever, and a float connected to said lever.

6. A trap of the character described comprising a float chamber with an inlet and an outlet and adjacent the outlet a support having a valve seat, an operating lever, a valve carried by said operating lever and adapted to be moved to and from engagement with said valve seat as said lever is swung, a supporting pin for said lever, said lever provided with an elongated slot for receiving said supporting pin, said lever having a projecting fulcrum portion extending out of line with said slot, said support provided with a fulcrum boss spaced beyond said supporting pin and adapted to be engaged by the fulcrum portion of said lever when said lever is swung to a predetermined position whereby a plurality of spaced progressively operating fulcrum points will be provided for said lever, and a float connected to said lever.

7. A trap of the character described comprising a float chamber having an inlet and an outlet and a support having a valve seat at the outlet, a plate having vertical extending sides, said sides being slotted, a lever mounted upon said support and provided with a laterally projecting arm, a valve carried by said lever, said lever fitting between said extending sides, the projecting arm of said lever fitting between and projecting through the slotted sides of said guide whereby said lever will be held against displacement and in alignment with said valve seat, said lever having a plurality of laterally extending fingers of different depth to provide fulcrums to produce changeable progressively operating fulcrums for said lever as said lever is swung.

8. In a trap of the character described the combination with a casing and removable cover therefor forming a float chamber with an inlet at the bottom and an outlet at the top, both being formed in the casing, of a valve adapted to control said outlet, a lever carrying said valve, said lever being provided with a plurality of spaced knife edge fulcrums spaced longitudinally of and extending transversely of the lever and engageable progressively with fixed parts carried by the casing during opening of the valve, an inverted bucket float within the float chamber above the inlet operatively connected to the lever and means carried by the casing for retaining the lever in operative position.

9. In a trap of the character described the combination with a float chamber having an outlet valve seat of a valve adapted to seat on said valve seat, a lever by which said valve is carried, said lever being provided with a plurality of knife edge fulcrums spaced longitudinally of and extending transversely of the lever, one fulcrum being engageable with a fixed part of the float chamber close to the valve seat when the valve is in closed position and the other fulcrum being engageable with a fixed part of the float chamber effectively farther from the valve seat when the valve is moved to partly open position and a float operatively connected to the lever and movable in the float chamber.

10. In a trap of the character described the combination with a float chamber having an inlet at the bottom and an outlet at the top with a valve seat surrounding said outlet, of a valve adapted to seat on said valve seat, a lever by which said valve is carried, said lever being provided with a plurality of knife edge fulcrums spaced longitudinally of and extending transversely of the lever, one fulcrum being engageable with a fixed part of the float chamber close to the valve seat when the valve is in closed position and the other fulcrum element being engageable with a fixed part of the float chamber effectively farther from the valve seat when the valve is moved to partly open position and an inverted bucket float in the float chamber above said inlet and operatively connected to said lever.

11. In a trap of the character described the combination with a float chamber having an inlet at the bottom and an outlet at the top with an outlet valve seat of a valve adapted to seat on said valve seat, an operating lever on which the valve is carried having a plurality of fulcrums spaced longitudinally along said lever and engageable with fixed parts of the casing at effectively different distances from the line of movement of the valve to provide progressively less leverage and greater movement of the valve as the valve is moved from closed position, and an inverted bucket float within the float chamber and depending from the operating lever.

JAMES W. KAYE.